June 28, 1955  W. R. TRIPLETT  2,712,113
HOUSING FOR ELECTRICAL MEASURING INSTRUMENTS
Filed Jan. 3, 1951
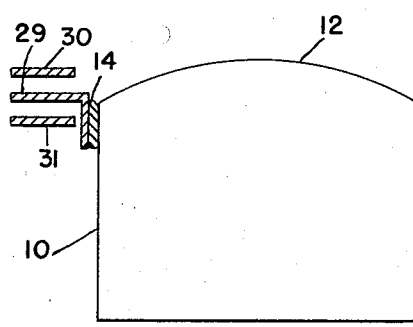
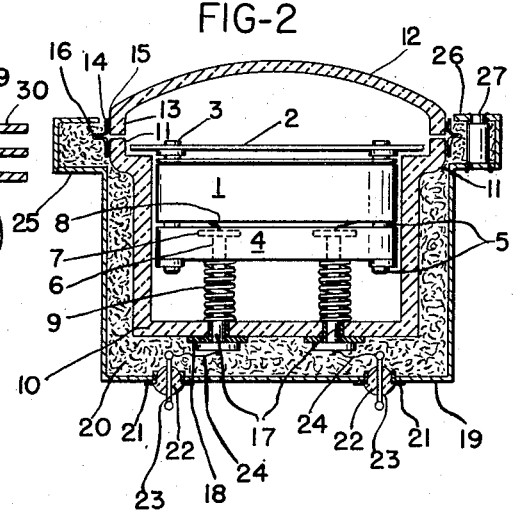
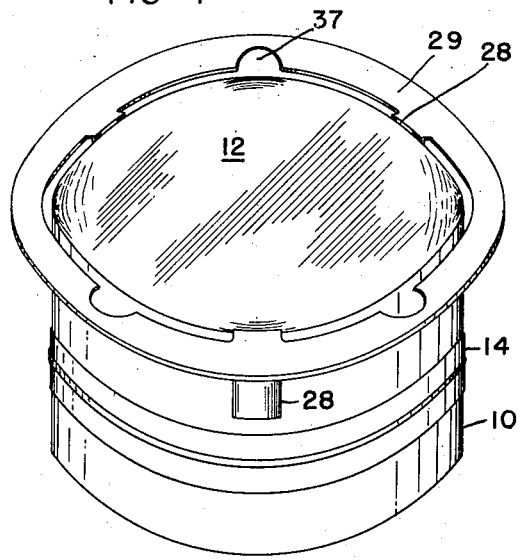
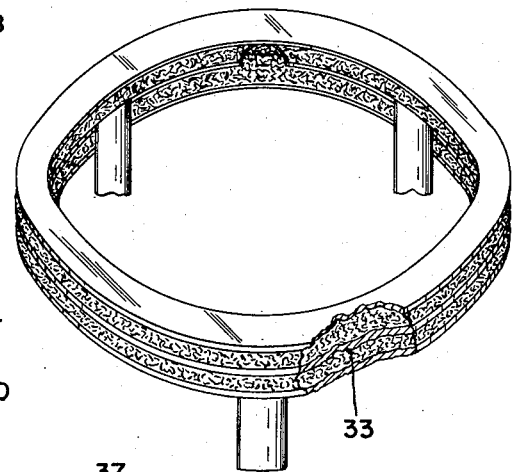
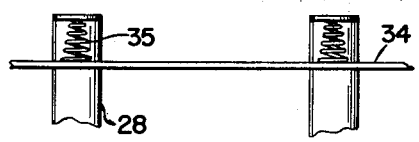
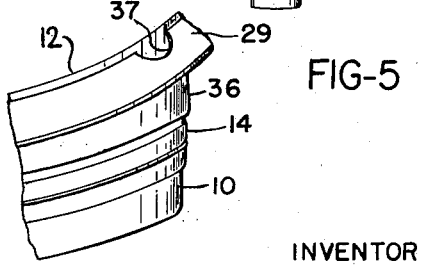
INVENTOR
WILLIAM R. TRIPLETT
BY
ATTORNEYS United States Patent Office 2,712,113
Patented June 28, 1955

2,712,113

HOUSING FOR ELECTRICAL MEASURING INSTRUMENTS

William R. Triplett, Bluffton, Ohio, assignor to The Triplett Electrical Instrument Company, Bluffton, Ohio, a corporation of Ohio Application January 3, 1951, Serial No. 204,140

8 Claims. (Cl. 324—156)

The present invention relates to electrical measuring instruments and more especially to an improvement in the joint between the window and the casing. The invention is also directed to an all-glass or all-plastic casing, including the window, together with an improved form of shock absorbing enclosure which, in the case of a glass encasing also reduces the tendency to breakage when subjected to extreme shocks.

In the conventional form of instrument a glass window is usually inserted into an annular recess of a metal case and the window is metallized about its periphery and the edge is soldered to the metal case. Experience has shown that under these conditions the edge of the glass window is often chipped and broken and thus leaves an imperfect seal.

It will be understood that in these delicate forms of instruments, it is practically a necessity to prevent the entrance of moisture or even moisture laden air into the interior of the case as many deleterious effects are caused thereby. It has been found that even when a perfect soldering joint has been accomplished between the glass window and metal case of a conventional instrument, cracks and pinholes are still liable to develop at the soldered joint when the instrument is subjected to extreme temperatures. This is caused by the large mass of metal having different temperature conductivity coefficients which cause unequal stresses and strains. Even though the coefficient of expansion of metal and glass can be made quite similar, the rate at which each will absorb and conduct heat is in great variance.

The primary object of the invention is to provide an all-glass or an all-plastic instrument case including the window and in which the case is rendered breakage proof and, if desired, protected from shock.

Another object is to shock proof the case of a delicate instrument such as a voltmeter, ammeter, ohmmeter, etc. in a practical, inexpensive manner, and in which the shock relieving device or accessory can be applied equally well to instrument cases made of metal or of breakable material.

Still another object is to provide an instrument case including a window, made of a moldable material and in which the joint between the window is rendered hermetically sealed.

A further object is to provide an instrument enclosure formed of two parts in order to permit the insertion of the instrument mechanism, and in which the parts are fused or otherwise hermetically sealed together.

Another object is to provide an instrument case formed of moldable material in two parts and in which the parts are hermetically secured together by means of a peripherally positioned metal strip.

A further object is to provide a mounting for an electrical measuring instrument in which the mounting offers considerable resilience, both to tensional and compressional stresses to support the instrument parts in a completely shock resisting manner.

Still another object is to provide a case for electrical instruments, including the window thereof, and constituted of a transparent moldable material and in which the various parts of the case can be readily molded to shape and dimensions and the case is supported in a manner as to readily withstand vibration or even shocks of greater amplitude.

Another object is to provide an electrical measuring instrument constituted either of a fracturable moldable material or of thin metal with a protective casing containing vibration or shock absorbing material in order to protect the instrument case and the contained parts.

The invention will be better understood when reference is made to the following description and the accompanying drawings, in which:

Figure 1 represents an improved shock proof mounting for supporting a delicate instrument, the latter being illustrated in outline form;

Figure 2 shows in section, but with the instrument parts in elevation, the instrument casing that is illustrated in Figure 1 but to which a protective and shock proof covering or envelope has been applied;

Figure 3 represents a fragmentary view of a shock absorbing element which may be used in connection with the flanged supporting structure illustrated in Figure 1;

Figure 4 is a perspective view showing in outline the improved instrument case to which has been applied an improved flanged element for supporting the case on a panel or on any other suitable structure;

Figure 5 is a fragmentary view showing a part of the structure illustrated in Figure 4 but with a modified form of flange ring;

Figure 6 represents a perspective view, partly broken away to indicate the various parts of the improved flange support for the instrument casing, together with shock absorbing elements which are extremely desirable, particularly in the case of fracturable molded instrument cases; and Figure 7 is a fragmentary detailed view of a modified structure for resiliently supporting the improved instrument case from the panel.

Referring more particularly to Fig. 2, reference character 1 represents the usual instrument of horse-shoe shape and 2 the instrument dial suitably supported as at 3 from the magnet. A needle attached to a rotor is caused to move over the dial 2 when current is applied to the wound portion of the rotor and the latter reacts with the magnet 1 as is well understood in the art.

In accordance with one of the features of my invention, the magnet 1 is superposed over an insulating block 4 which may be of same shape and size as the magnet, this block being supported from the magnet by spacers (not shown) and all of the structure being carried by locating studs 5.

The block 4 is preferably constituted of a moldable material such as hard rubber, Bakelite, and during the molding process a pair of metal mounting studs 6 are inserted in the block and held in position by the cap-like top 7. Electrical connections 8 are taken from opposite sides of the rotor through stationary bearings as is well known in the art. These studs 6, or rather the portions which extend below the block 4, are threaded into springs 9 which serve resiliently to mount the block above the bottom of the instrument case 10.

This casing may be constituted of metal but is preferably made of a moldable material such as plastic or glass, of any desired thickness except that in the case of the window described hereinafter, the material must be sufficiently thin as to allow a high degree of transparency in order to observe the readings. The casing is formed cup-shaped, and as illustrated, is provided at the top or open mouth with a flared or shoulder portion 11 to provide the necessary diametral dimension for the dial 2. The window 12 is preferably molded to a concave shape with a circumferential lip 13 of substantial width and of the same diameter as the shoulder portion 11. The concave configuration of the window adds strength to this element, thus rendering the casing as a whole less liable to breakage.

After the instrument parts have been inserted into the lower portion of the casing with the window removed, the latter can be secured in position by means of a fused joint at the lip and shoulder portions 13, 11, thereby providing a hermetic seal to prevent the entrance of moisture in liquid or vapor form. However, I prefer to join the window and the casing proper by means of a metallizing process which is performed on the circumferential area of the lip and shoulder portions, and then a thin metal strip or band 14 is soldered, as indicated at 15, to the metallized surfaces which extend over both parts of the casing. The ends of the band can be neatly soldered together or otherwise secured.

It will be noted that this strip is somewhat wider than the joined areas to leave an outwardly extending ridge 16 to constitute an accordion pleat which provides considerable "give" in the vertical direction and thereby to accommodate any changes in relative positions through expansion or otherwise of the window and the casing elements when subjected to heat or other conditions. The soldered joint between the metal band and the casing surface assures a perfect hermetic seal even when allowing a liberal vertical movement between the two portions of the casing.

It has been found that since the metallizing of the plastic or glass surface and the application of the metal strip occurs on the outside surface of the casing where there are large surfaces involved and the surface is readily accessible, the work of forming the hermetic joint becomes an easy task. Moreover, any differences of coefficients of expansion of the metal and glass, regardless of whether large or small, will not effect the hermetic character of the joint because the amount of metal involved is relatively small and the sealed surfaces are relatively large. Any heat developed at the joint can be readily conducted away by the relatively thick material out of which the case is made.

A pair of mounting studs 17 is pressed into eyelets 18 which are preferably molded in position, these studs extending up into the springs 9 to a position short of the lower end of the mounting studs 6 and thus to leave a space therebetween subtended only by each spring. Thus the block 4 is resiliently mounted on the bottom of the case 10. The electrical connection 8 through the studs 6 is then carried through the relatively tightly fitted spring 9 to the lower studs 17.

In order to protect the case 10 from external blows, vibration or sudden shocks, I provide a protective cover. This cover may consist of a shell or housing 19 constituted of metal or any other suitable material, and the space between the housing and the glass or plastic case is filled with a suitable resilient material 20, such as silicon glass fiber, etc., to provide additional shock protection. The lower end or bottom of the housing 19 is provided with a pair of metal eyelets 21 which carries a glass bead 22 supporting a centrally positioned conductor 23. A wire 24 is taken from the inner end of each conductor to the head portion of the studs 17 in order to complete an electrical circuit from each side of the rotor of the instrument to the wires 23.

The upper end of the housing 19 is flanged as indicated at 25 and about this flange there is positioned an angularly shaped circular metal member 26 which may be staked as indicated at 27 to the flange 25. The same resilient material such as silicon glass fiber which is contained between the housing 19 and the glass or plastic casing, is also packed into the space between the circular member 26 and the flanged portion 25, the material being rammed in so tight as to hold the ridge 16 of the metal strip 14 firmly in position.

From the foregoing it is evident that I have disclosed an all-glass or all-plastic instrument case containing the necessary electrical, magnetic and mechanical parts and the case being hermetically sealed at the window portion along a large circumferential area and the case contained within shock proof material. This material provides a reasonable amount of resiliency, particularly at the annular ledge 16, so that there is a certain amount of "give" to the case within the housing 19 while maintaining a relatively firm positional relationship between the instrument case and the housing. The resilient material constitutes a good insulator so that there is absolutely no possibility of shorting the instrument leads or even of encouraging leakage between the leads when the instrument is employed in damp or humid positions.

In Fig. 1 there is shown another method of resiliently mounting the instrument case 10 and its window 12 on a suitable support such as a panel. In this figure, the case is shown in outline and corresponding parts are given the same reference characters as in Fig. 2. The metal ribbon 14 is provided to hermetically seal the parts of the case together, as explained in connection with Fig. 2. However, as shown in Fig. 1, the circular ridge may be slotted at three equidistantly positioned points about the circumference in order to provide suitable surfaces for the affixation of three or more lips or fingers indicated at 28. These lips are constituted of springy metal and carrying at the top an outwardly extending flanged ring 29.

By forming the ring 29 and the lips 28 out off springy metal, the lips can be pressed downwardly against the metal ribbon 14 to provide a tight securing fit, even in the absence of solder being applied to the abutting surfaces. However, as stated hereinbefore, if desired, solder may be applied in order to assure greater permanency of the holding effect between the fingers and the metal ribbon.

The ring 29 is resiliently supported in order to permit the case 10 to move slightly in the vertical direction in response to vibration or external shocks, while the springy lips or fingers 28 allow a certain amount of movement in the transverse direction due to the same cause. This resilient support is provided in a number of different ways and, as shown in Fig. 1, the ring 29 is positioned between two other rings 30, 31. A resilient element such as a corrugated ring 32 constituted of relatively thin springy metal may be inserted between the rings 29, 30 and between the rings 29, 31. Screws (not shown) may be equidistantly positioned about the rings for securing the latter to a panel board or plate (not shown). If desired, the space between the rings 29, 30, 31 may be filled with solid rubber of high resiliency or with sponge rubber which conveniently may take the form of rings 33 (Fig. 6) of the same size as the metal rings. Still another alternative and practical way of providing the necessary resilient effect between the respective rings 29, 30, 31 is to apply rubber spacers (not shown) about each of the retaining screws (not shown) which secure the rings to the panel.

Fig. 7 shows still further another method and apparatus for resiliently mounting the instrument case 10 on the panel. In this case a metal ring 34 is provided which can be screwed directly to the panel and the lips or fingers 28 may be made separate from the ring 34, and a conically shaped compression spring 35 positioned between the upper surface of the ring and the angularly extending projection of the finger 28. Thus these fingers are resiliently suspended from the top of the stationary ring 34 and the case 10 is shock proofed in both the vertical and transverse directions since the uppermost end of each spring 35 permits movement in practically every direction.

It may be desirable to have the lips or fingers 28 extend for a considerable distance along the length of the case 10, in which case the metal strip 14 is moved further down the case than that shown in Fig. 2 in order to clear the lower surface of the fingers, thus necessitating a window element 12 of greater depth. In this case, inasmuch as the fingers 28 do not contact the metal strip 14, there is no opportunity of applying solder to the abutting metal parts so that the fingers must retain the case 10 solely by a gripping effect.

It will also be apparent that in place of separate fingers 28 the gripping element may comprise a peripherally complete ring 36 as shown in Fig. 5, this ring being formed as an angularly disposed portion of the flat ring 29, performing the function of resiliently gripping the outside surface of the case in the same manner as the fingers 28. It may be desirable, in order to increase the resiliency offered by the rings 29, 30, 31, to provide the latter with cut-outs 37 (Fig. 4) to allow relative movement between the various parts of the rings in the transverse direction.

From the foregoing it is evident that I have disclosed an electrical measuring instrument in which the parts are of standard design but the instrument is contained in an all-glass or all-plastic case formed of two parts in order to allow the insertion of the electrical measuring unit and suitably secured together, the case being suspended on its panel by various forms of resilient mounts which permit the case to take up without injury any mechanical impulses originating outside the instrument. The improved construction of the case, including the securement of the parts, are such that the different temperature conductivity coefficients of metal and glass or plastic play no important parts during the operation of the device since the mass of metal that is used is relatively small as compared to that of the glass or plastic.

In addition to providing a resilient mount of various types outside of the glass case, the instrument parts are resiliently carried within the case by suitable springs, all provisions of which produce a device which is not deleteriously affected by shock or vibration of any character or amplitude.

It will be understood that various modifications and arrangements in structure could be made without departing from the spirit of my invention and, accordingly, I desire to comprehend such modifications and substitutions of equivalents as may be considered to come within the scope of the appended claims.

Having thus fully described my invention, what I claim as new and desire to secure by Letters Patent, is:

1. An electrical measuring instrument comprising a cylindrical case constituted of moldable insulating material, said case being open at one end and closed at the other end, the closure for the open end of the case comprising a window portion of moldable transparent material, said window portion having a circumferential lip, the circumferential areas of the case and window portions adjacent one another being metalized, a metal band hermetically sealed to said metalized areas in order to seal the window portion and the case together, a middle portion of said metalized band forming a pleat and extending radially outward from said case, and an electrical measuring unit within said case including a dial and indicator viewable through said window portion.

2. An electrical measuring instrument comprising a cylindrical case constituted of moldable insulated material, said case being open at one end and closed at the other end, a closure for the open end of the case comprising a window portion of moldable transparent material, said window portion being formed as a concave element having a circumferential lip of the same diameter as the case, said lip having a substantially greater longitudinal length than the thickness of said window portion in order to provide a substantial circumferential area, the circumferential areas of the case and window portions adjacent one another being metalized, a metallic band hermetically sealed to said metalized areas in order to seal the window portion and case together, a middle portion of said metalized band forming a pleat and extending radially outward from said case, and an electrical measuring unit within said case including a dial and indicator viewable through said window portion.

3. An electrical measuring instrument as in claim 1, and mounting means for said measuring unit.

4. An electrical measuring instrument as in claim 1, and mounting means for said measuring instrument comprising a ring surrounding the case edgewise and having a plurality of resilient elements extending lengthwise of the case and adapted to grip the case.

5. An electrical measuring instrument as in claim 1, and mounting means for said measuring instrument comprising a ring surrounding the case edgewise, a pair of rings located on opposite sides of the first-mentioned ring, and resilient material positioned within the annular spaces between said rings.

6. An electrical measuring instrument as in claim 1, and mounting means for said measuring instrument comprising a ring surrounding the case edgewise, and provided with gripping elements which embrace the case at a plurality of positions.

7. An electrical measuring instrument as in claim 1, and mounting means for said measuring instrument comprising a ring surrounding the case edgewise and having an extension which resiliently supports the case.

8. An electrical measuring instrument as in claim 1, and mounting means for said measuring instrument comprising a ring presented edgewise to the case, and a plurality of depending elements extendly outwardly from said ring, adapted to embrace and grid said case, said ring and elements being connected together through spring devices.

References Cited in the file of this patent

UNITED STATES PATENTS

| Number | Name | Date |
| --- | --- | --- |
| 1,307,685 | Letord | June 24, 1919 |
| 1,804,330 | Faus | May 5, 1931 |
| 2,150,836 | Lamb | Mar. 14, 1939 |
| 2,235,680 | Haven | Mar. 18, 1941 |
| 2,320,946 | Madden | June 1, 1943 |
| 2,352,049 | Weaver | June 20, 1944 |
| 2,364,724 | Klay et al. | Dec. 12, 1944 |
| 2,367,449 | Triplett | Jan. 16, 1945 |
| 2,604,229 | Schwarz | July 22, 1952 |

OTHER REFERENCES

Publication: "Instruments," volume 18, July 1945 page A35 (advertisements), Patent Office Library Q 184, 159.